US010482240B2

(12) United States Patent
Kawakita

(10) Patent No.: US 10,482,240 B2
(45) Date of Patent: Nov. 19, 2019

(54) ANTI-MALWARE DEVICE, ANTI-MALWARE SYSTEM, ANTI-MALWARE METHOD, AND RECORDING MEDIUM IN WHICH ANTI-MALWARE PROGRAM IS STORED

(71) Applicant: NEC Corporation, Tokyo (JP)

(72) Inventor: Masaru Kawakita, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 203 days.

(21) Appl. No.: 15/543,599

(22) PCT Filed: Jan. 21, 2016

(86) PCT No.: PCT/JP2016/000293
§ 371 (c)(1),
(2) Date: Jul. 14, 2017

(87) PCT Pub. No.: WO2016/121348
PCT Pub. Date: Aug. 4, 2016

(65) Prior Publication Data
US 2018/0004939 A1  Jan. 4, 2018

(30) Foreign Application Priority Data

Jan. 29, 2015 (JP) .................................. 2015-014873

(51) Int. Cl.
*H04L 29/06* (2006.01)
*G06F 21/53* (2013.01)
(Continued)

(52) U.S. Cl.
CPC ............ *G06F 21/53* (2013.01); *G06F 21/562* (2013.01); *G06F 21/565* (2013.01);
(Continued)

(58) Field of Classification Search
CPC ...... G06F 21/53; G06F 21/562; G06F 21/565; G06F 21/566; G06F 21/57; G06F 21/554;
(Continued)

(56) References Cited

U.S. PATENT DOCUMENTS 8,418,251 B1 * 4/2013 Satish .................. G06F 21/562
726/22
8,959,624 B2 * 2/2015 Gray ..................... G06F 21/552
726/1
(Continued)

FOREIGN PATENT DOCUMENTS

JP  2012-221216 A  11/2012
JP  2013-514594 A  4/2013
(Continued)

OTHER PUBLICATIONS

International Search Report of PCT/JP2016/000293 dated Apr. 26, 2016.

*Primary Examiner* — Sarah Su
(74) *Attorney, Agent, or Firm* — Sughrue Mion, PLLC

(57) ABSTRACT

An anti-malware device 50 includes: a risk information storage unit 51 in which risk information 510 is stored, in which there are associated a value indicating an attribution of an information processing device 60 for executing software 600, a value indicating an attribution of the software 600, and a value that indicates the degree of risk when the software 600 is executed; a subject attribution collection unit 53 for collecting the value indicating the attribution of the information processing device 60; an object attribution collection unit 54 for collecting the value indicating the attribution of the software 600; and a determination unit 55 for determining that the software 600 is malware when the value indicating the degree of risk obtained by comparing the risk information 510 and the values collected by the (Continued)

subject attribution collection unit 53 and object attribution collection unit 54 satisfies a criterion.

18 Claims, 9 Drawing Sheets

(51) Int. Cl.
    *G06F 21/56*     (2013.01)
    *G06F 21/57*     (2013.01)
    *G06F 21/55*     (2013.01)

(52) U.S. Cl.
    CPC ............ *G06F 21/566* (2013.01); *G06F 21/57* (2013.01); *H04L 63/1433* (2013.01); *G06F 21/554* (2013.01); *G06F 21/563* (2013.01); *H04L 63/1491* (2013.01)

(58) Field of Classification Search
    CPC .............. G06F 21/563; H04L 63/1433; H04L 63/1491
    See application file for complete search history.

(56) References Cited

U.S. PATENT DOCUMENTS

| | | | |
|---|---|---|---|
| 9,069,957 B2* | 6/2015 | Tuvell | G06F 21/55 |
| 2011/0145926 A1 | 6/2011 | Dalcher et al. | |
| 2013/0347094 A1* | 12/2013 | Bettini | H04L 63/0245 |
| | | | 726/11 |
| 2014/0082729 A1 | 3/2014 | Shim et al. | |
| 2014/0096241 A1* | 4/2014 | Li | H04L 63/12 |
| | | | 726/22 |
| 2015/0040246 A1* | 2/2015 | Yuen | H04L 63/168 |
| | | | 726/30 |
| 2015/0101050 A1* | 4/2015 | Nielson | G06F 21/552 |
| | | | 726/23 |
| 2015/0207812 A1* | 7/2015 | Back | H04L 63/1441 |
| | | | 726/23 |
| 2015/0350249 A1* | 12/2015 | Reno | H04L 63/1433 |
| | | | 726/1 |
| 2016/0006766 A1* | 1/2016 | Joo | H04L 63/145 |
| | | | 726/1 |
| 2016/0173446 A1* | 6/2016 | Nantel | H04L 63/1425 |
| | | | 726/11 |

FOREIGN PATENT DOCUMENTS

| | | |
|---|---|---|
| JP | 2014-063490 A | 4/2014 |
| JP | 2014-519113 A | 8/2014 |

* cited by examiner

Fig. 2

110 OBJECT ATTRIBUTION DATABASE

| IP ADDRESS OF SUBJECT DEVICE | PARENT ORGANIZATION | INSTALLATION COUNTRY |
|---|---|---|
| IP ADDRESS 1000 | ORGANIZATION A | COUNTRY X |
| IP ADDRESS 1001 | ORGANIZATION A | COUNTRY Y |
| IP ADDRESS 1002 | ORGANIZATION B | COUNTRY X |
| IP ADDRESS 1003 | ORGANIZATION C | COUNTRY Z |
| IP ADDRESS 1004 | ORGANIZATION D | COUNTRY X |
| ⋮ | ⋮ | ⋮ |

Fig. 3

111 OBJECT ATTRIBUTION DATABASE

| HASH VALUE | DEVELOPMENT SOURCE COUNTRY | DEVELOPMENT SOURCE LINGUISTIC AREA |
|---|---|---|
| 00001 | COUNTRY X | LANGUAGE x |
| 00002 | COUNTRY Y | LANGUAGE y |
| 00003 | COUNTRY Z | LANGUAGE z1 |
| 00004 | COUNTRY Z | LANGUAGE z2 |
| 00005 | COUNTRY W | LANGUAGE w1 |
| ⋮ | ⋮ | ⋮ |

Fig. 4

| PARENT ORGANIZATION | INSTALLATION COUNTRY | SECURITY POLICY | RISK INDEX BY POLICY VIOLATION |
|---|---|---|---|
| ORGANIZATION A | COUNTRY X | SECURITY POLICY AX | 70 |
| ORGANIZATION A | COUNTRY Y | SECURITY POLICY AY | 30 |
| ORGANIZATION B | COUNTRY X | SECURITY POLICY BX | 20 |
| ORGANIZATION C | COUNTRY Z | SECURITY POLICY CZ | 20 |
| ORGANIZATION D | COUNTRY X | SECURITY POLICY DX | 50 |
| ... | ... | ... | ... |

112 SUBJECTIVE DATABASE

Fig. 5A 113-1 OBJECTIVE DATABASE

| IP ADDRESS OF COMMUNICATION DESTINATION | COMMUNICATION FREQUENCY (NUMBER OF TIMES PER HOUR) | RISK INDEX DURING OCCURRENCE OF EVENT |
|---|---|---|
| IP ADDRESS 2000 | 1~5 | 10 |
| | 6~10 | 20 |
| | 11 OR MORE | 30 |
| IP ADDRESS 2001 | 1~5 | 20 |
| | 6~10 | 40 |
| | 11 OR MORE | 60 |
| ... | ... | ... |

Fig. 5B 113-2 OBJECTIVE DATABASE

| SYSTEM CALL TYPE | OCCURRENCE FREQUENCY (NUMBER OF TIMES PER HOUR) | RISK INDEX DURING OCCURRENCE OF EVENT |
|---|---|---|
| SYSTEM CALL A | 1~2 | 20 |
| | 3~5 | 30 |
| | 6 OR MORE | 40 |
| SYSTEM CALL B | 1~2 | 40 |
| | 3~5 | 60 |
| | 6 OR MORE | 80 |
| ... | ... | ... |

Fig. 6

114 CIRCUMSTANCE DATABASE

| DEVELOPMENT SOURCE COUNTRY | DEVELOPMENT SOURCE LINGUISTIC AREA | INSTALLATION COUNTRY | RISK INDEX BY UNAUTHORIZED OPERATION |
|---|---|---|---|
| COUNTRY Z | LANGUAGE z1 | COUNTRY V | 30 |
| COUNTRY Z | LANGUAGE z2 | COUNTRY V, W | 40 |
| COUNTRY W | LANGUAGE w1 | WHOLE WORLD | 80 |
| COUNTRY W | LANGUAGE w2 | COUNTRY Y | 10 |
| COUNTRY W | LANGUAGE w3 | COUNTRY X | 20 |
| ... | ... | ... | ... |

ANTI-MALWARE DEVICE, ANTI-MALWARE SYSTEM, ANTI-MALWARE METHOD, AND RECORDING MEDIUM IN WHICH ANTI-MALWARE PROGRAM IS STORED

CROSS REFERENCE TO RELATED APPLICATIONS

This application is a National Stage of International Application No. PCT/JP2016/000293 filed Jan. 21, 2016, claiming priority based on Japanese Patent Application No. 2015-014873 filed Jan. 29, 2015, the contents of all of which are incorporated herein by reference in their entirety.

TECHNICAL FIELD

The present invention relates to an anti-malware device and the like that detect malware and take a countermeasure against the malware.

BACKGROUND ART

In recent years, a threat to security due to malicious software (hereinafter referred to as malware) that provides a computer with an unauthorized command has been a social issue. Accordingly, expectations have been raised for a technique for accurately detecting malware getting into a computer so as to eliminate such a threat to security.

As an example of a technique related to the above-mentioned technique, PTL 1 discloses a malware analysis system that receives a malware candidate sample from a firewall, and automatically generates a signature code when it is determined that the sample is malware. This system determines whether or not the malware candidate sample is malware by using various heuristic methods.

CITATION LIST

Patent Literature

[PTL 1] Japanese Translation of PCT International Application Publication No. 2014-519113

SUMMARY OF INVENTION

Technical Problem

In a general malware detection method, it is determined that software is malware, based on a feature or behavior of a binary code constituting the software (e.g., a communication procedure and a feature of a communication destination domain). Specifically, in the general malware detection method, malware is detected based only on an event by objectively observing an operation of software. For example, the malware analysis system described in PTL 1 determines that the software is malware when at least one of the following events is observed.

Connecting to a non-standard HTTP (Hyper Text Transfer Protocol) port for HTTP traffic,
Accessing an imaginary domain,
Downloading an executable file including a non-standard executable file extension,
Executing a DNS (Domain Name System) query for an e-mail server,
Performing communication using an HTTP header having a length shorter than a general length,
Performing communication by a post method in HTTP traffic,
Connecting to a non-standard IRC (Internet Relay Chat) port for IRC traffic,
Performing communication by using an intrusion prevention system avoidance method,
Performing communication with non-classified traffic via an HTTP port,
Accessing a domain having a domain name longer than a length of a general domain name,
Accessing a dynamic DNS domain,
Accessing a fast flux domain (using DNS round robin), and
Accessing a recently created domain.

However, the above-mentioned events are not always generated with malicious intention, but may be generated by a provider that has distributed software, or a user that executes software, for an unmalicious valid purpose. More precisely, whether or not software is malware is determined not only by an event objectively observed with regard to an operation of the software, but also by various factors depending on an attribution of a subject that executes the software and an attribution of the software. The malware analysis system described in PTL 1 does not determine whether or not software is malware from information based on a comprehensive aspect (viewpoint) in consideration of the above-mentioned various factors. Accordingly, the malware analysis system has a problem that the determination cannot be made with high accuracy. A principal object of the present invention is to provide an anti-malware device and the like that solve the above-mentioned problem.

Solution to Problem

An anti-malware device according to one aspect of the present invention includes: a storage means for storing risk information in which there are associated a value indicating an attribution of a first information processing device configured to execute software, a value indicating an attribution of the software, and a value that depends on the attributions of the first information processing device and the software and that indicates a degree of risk when the software is executed by the first information processing device; a subject attribution collection means for collecting the value indicating the attribution of the first information processing device from outside; an object attribution collection means for collecting the value indicating the attribution of the software from outside; and a determination means for determining that the software is malware when the value indicating the degree of risk satisfies a criterion, the value being obtained by comparing the risk information with the values collected by the subject attribution collection means and the object attribution collection means.

As another aspect to attain the above-mentioned object, an anti-malware method according to one aspect of the present invention includes, when a storage means stores risk information in which there are associated a value indicating an attribution of a first information processing device configured to execute software, a value indicating an attribution of the software, and a value that depends on the attributions of the first information processing device and the software and that indicates a degree of risk when the software is executed by the first information processing device: by a third information processing device, collecting the value indicating the attribution of the first information processing device from outside; collecting the value indicating the attribution of the software from outside; and determining that the software is malware when the value indicating the degree of risk satisfies a criterion, the value being obtained by comparing the risk information with the values collected, indicating the attribution of the first information processing device and the attribution of the software.

As further aspect to attain the above-mentioned object, an anti-malware program according to one aspect of the present invention causes a computer accessible to a storage means for storing risk information in which there are associated a value indicating an attribution of a first information processing device configured to execute software, a value indicating an attribution of the software, and a value that depends on the attributions of the first information processing device and the software and that indicates a degree of risk when the software is executed by the first information processing device, to execute: a subject attribution collection process of collecting the value indicating the attribution of the first information processing device from outside; an object attribution collection process of collecting the value indicating the attribution of the software from outside; and a determination process of determining that the software is malware when the value indicating the degree of risk satisfies a criterion, the value being obtained by comparing the risk information with the values collected by the subject attribution collection process and the object attribution collection process.

Further, the present invention may also be implemented by a computer-readable non-volatile recording medium storing the anti-malware program (computer program).

Advantageous Effect of Invention

The present invention is capable of detecting malware with high accuracy.

BRIEF DESCRIPTION OF DRAWINGS

FIG. 2 is a diagram illustrating a configuration of a subject attribution database 110 according to the first example embodiment of the present invention;

FIG. 3 is a diagram illustrating a configuration of an object attribution database 111 according to the first example embodiment of the present invention;

FIG. 4 is a diagram illustrating a configuration of a subjective database 112 according to the first example embodiment of the present invention;

FIG. 5A is a diagram illustrating a configuration of an objective database 113-1 according to the first example embodiment of the present invention;

FIG. 5B is a diagram illustrating a configuration of an objective database 113-2 according to the first example embodiment of the present invention;

FIG. 6 is a diagram illustrating a configuration of a circumstance database 114 according to the first example embodiment of the present invention;

DESCRIPTION OF EMBODIMENTS

Example embodiments of the present invention will be described in detail below with reference to the drawings.
<First Example Embodiment>

Figure 1:
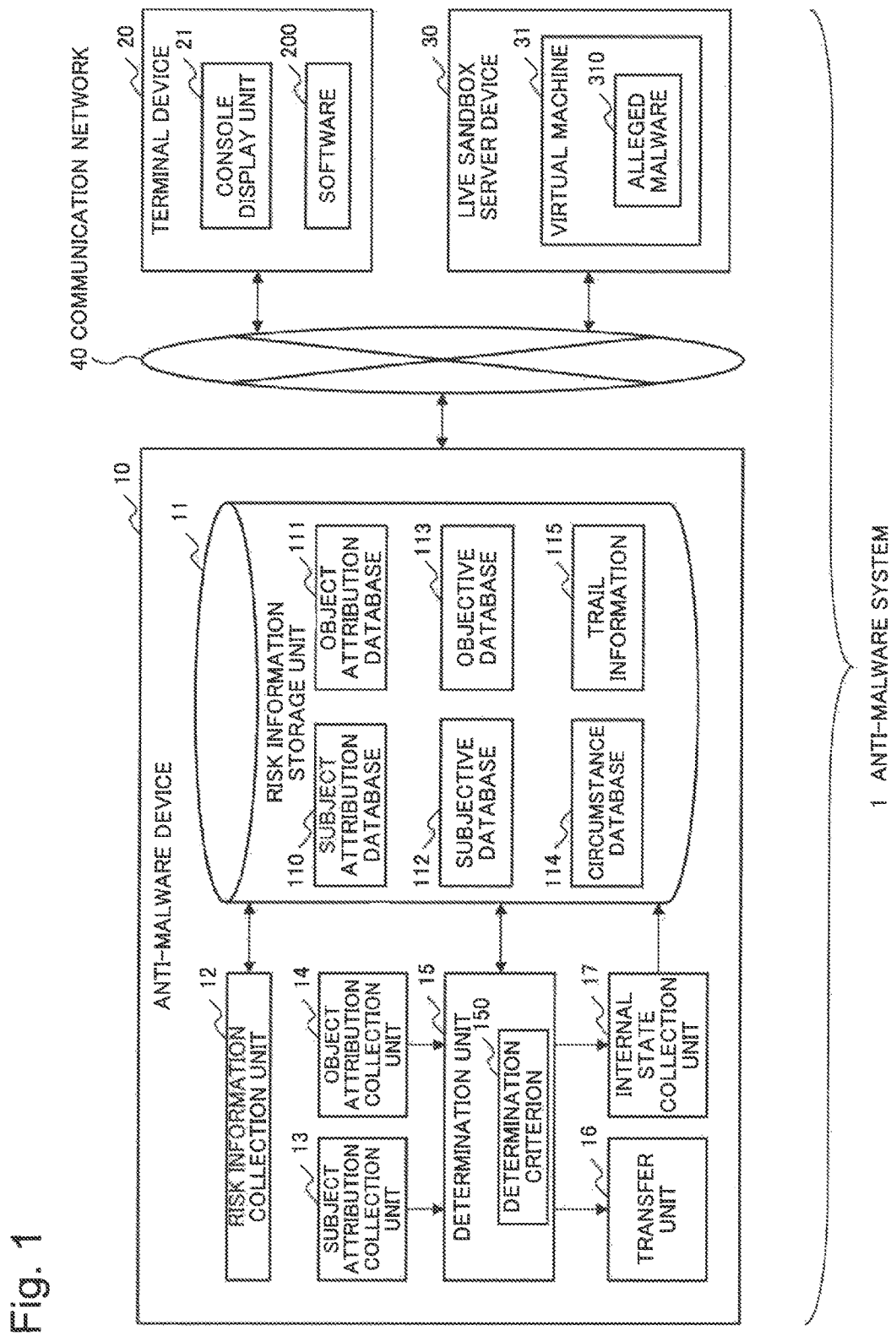
FIG. 1 is a block diagram illustrating a configuration of an anti-malware system 1 according to a first example embodiment of the present invention.

FIG. 1 is a block diagram conceptually illustrating an anti-malware system 1 according to a first example embodiment of the present invention. The anti-malware system 1 according to this example embodiment roughly includes an anti-malware device 10, a terminal device 20, a live sandbox server device 30, and a communication network 40. The anti-malware device 10, the terminal device 20, and the live sandbox server device 30 are connected via a communication network 40 in such a manner as to be able to communicate with each other. Note that the direction of each arrow in block diagrams of FIG. 1 and the like of the present invention is illustrated by way of example only, and is not intended to limit the direction of signals between blocks.

The terminal device 20 is an information processing device including a processor and a storage device (not illustrated) and is capable of executing software 200 which is externally obtained via the communication network 40. When the anti-malware device 10 determines that the software 200 is not malware, the terminal device 20 executes the software 200 in accordance with an instruction from the anti-malware device 10. The terminal device 20 displays the execution result of the software 200 on a console display unit 21. When the anti-malware device 10 determines that the software 200 is malware, the terminal device 20 does not execute the software 200. In this case, the anti-malware device 10 transfers the software 200 to the live sandbox server device 30 from the software 200.

The live sandbox server device 30 is an information processing device and executes a virtual machine 31. The live sandbox server device 30 may execute a plurality of virtual machines. The virtual machine 31 stores the software 200, which has been transferred from the terminal device 20, as alleged malware 310, and executes a process for the alleged malware 310 in accordance with an instruction from the anti-malware device 10. The virtual machine 31 outputs the execution result of the alleged malware 310 to the console display unit 21 in the terminal device 20. The virtual machine 31 can receive a user's input operation via the terminal device 20 during the execution of the alleged malware 310.

The anti-malware device 10 is a device for determining whether or not the software 200 acquired by the terminal device 200 is malware, and performing a process for taking a countermeasure against malware when it is determined that the software 200 is malware. The anti-malware device 10 includes a risk information storage unit 11, a risk information collection unit 12, a subject attribution collection unit 13, an object attribution collection unit 14, a determination unit 15, a transfer unit 16, and an internal state collection unit 17. The risk information storage unit 11 is a storage device such as an electronic memory or a magnetic disk. The risk information collection unit 12, the subject attribution collection unit 13, the object attribution collection unit 14, the determination unit 15, the transfer unit 16, and the internal state collection unit 17 may be electronic circuits, or may be implemented by a computer program and a processor that operates according to the computer program.

The risk information storage unit 11 stores a subject attribution database 110, an object attribution database 111, a subjective database 112, an objective database 113, a circumstance database 114, and trail information 115.

The subject attribution database 110 is information indicating a criterion for determining the attribution of the terminal device 20 that executes the software 200. FIG. 2 is a diagram illustrating a configuration example of the subject attribution database 110. As illustrated in FIG. 2, the subject attribution database 110 is a table in which information (data) indicating "subject device IP (Internet Protocol) address", information (data) indicating "parent organization", and information (data) indicating "installation country" are associated with each other. The "IP address of subject device" represents an IP address assigned to a device (hereinafter referred to as a subject device) that executes software to be determined whether or not to be malware (hereinafter referred to as object software). The "parent organization" represents an identifier capable of identifying an organization that owns the subject device. The "installation country" represents an identifier capable of identifying a country in which the subject device is installed, and is, for example, the name of the country, or a country code.

The subject attribution database 110 illustrated in FIG. 2 indicates that the device to which "IP address 1000" is assigned as "IP address of subject device" is owned by "organization A" and is installed in "country X", for example. A configuration example of the subject attribution database 110 illustrated in FIG. 2 is merely an example, and the configuration of the subject attribution database 110 may be different from the configuration example illustrated in FIG. 2.

The object attribution database 111 illustrated in FIG. 1 is information indicating a criterion for determining the attribution of the software 200. FIG. 3 is a diagram illustrating a configuration example of the subject attribution database 111. As illustrated in FIG. 3, the object attribution database 111 is a table in which information (data) indicating "hash value", information (data) indicating "development source country", and information (data) indicating "development source linguistic area" are associated with each other. The "hash value" indicates a value calculated by inputting a binary code of the object software to a predetermined hash function. The object attribution database 111 may include an IP address to be assigned to a distribution source device which has distributed the object software, instead of the "hash value".

The "development source country" represents an identifier capable of identifying a country where the object software has been developed. The "development source linguistic area" represents an identifier capable of identifying a linguistic area where the object software has been developed. The anti-malware device 10 can obtain "development source country" and "development source linguistic area" for the object software on the basis of the "hash value" that is determined by the content of character information included in a binary code, digital signature information, or the like. The object attribution database 111 illustrated in FIG. 3 indicates that the object software having "hash value" of "0004" has been developed in a linguistic area where "language z2" is used in "country Z", for example. A configuration example of the object attribution database 111 illustrated in FIG. 3 is merely an example, and the configuration of the object attribution database 111 may be different from the configuration example illustrated in FIG. 3.

The subjective database 112 illustrated in FIG. 1 is information indicating a criterion for determining the degree of risk depending on the attribution of the subject device when the subject device executes the object software. FIG. 4 is a diagram illustrating a configuration example of the subjective database 112. As illustrated in FIG. 4, the subjective database 112 is a table in which information (data) indicating "parent organization", information (data) indicating "installation country", information (data) indicating "security policy", and information (data) indicating "risk index by policy violation" are associated with each other. The "parent organization" represents an identifier capable of identifying an organization that owns the subject device. The "installation country" represents an identifier capable of identifying a country in which the subject device is installed. The "security policy" represents a content of a security policy applied to the subject device. In the example illustrated in FIG. 4, "security policy AX" is described as "security policy", for example, for convenience of explanation. However, the "security policy AX" is assumed to represent the content of the policy.

The "risk index by policy violation" represents a numerical value indicating the degree of risk when an event that violates a security policy occurs in the case where the subject device executes the object software. The "risk index by policy violation" indicates that the degree of risk increases as the value increases. For example, the subjective database 112 illustrated in FIG. 4 indicates that "security policy AX" is applied to the subject device that is installed in "country X" and owned by "organization A", and the risk index is "70" when an event that violates the "security policy AX" occurs. Similarly, the subjective database 112 illustrated in FIG. 4 indicates that "security policy CZ" is applied to the subject device installed in "country Z" and owned by "organization C", and the risk index is "20" when an event that violates "security policy CZ" occurs.

In general, the security policy applied to the subject device and the degree of risk when the security policy is violated vary depending on the attribution of the subject device. For example, a low level security policy is applied to the subject device that performs information processing with a low social importance, and the degree of risk is low when the security policy is violated. On the contrary, a high level security policy is applied to the subject device that performs information processing with a high social importance, and the degree of risk is high when the security policy is violated.

The objective database 113 illustrated in FIG. 1 is information indicating a criterion when the degree of risk depending on the attribution of the object software is determined in the case where the subject device executes the object software. With respect to the object software that is suspected to be malware, the objective database 113 associates the degree of risk with information obtained by static analysis on the source code or binary code of the object software and information obtained by dynamic analysis on the operation of the object software. Examples of information obtained by static analysis or dynamic analysis on the object software include the IP address of the communication destination, the communication frequency, the type of the system call, the occurrence frequency, and the type of argument used by the system call.

FIGS. 5A and 5B are diagrams illustrating two configuration examples of the objective database 113. An objective database 113-1 illustrated in FIG. 5A is an objective database relating to the IP address of the communication destination. As illustrated in FIG. 5A, the objective database 113-1 is a table in which information (data) indicating "IP address of communication destination", information (data)

indicating "communication frequency", and information (data) indicating "risk index during occurrence of event". For example, the objective database 113-1 indicates that the "risk index during occurrence of event" is "10" when "1 to 5" (number of times per hour) communication is performed on the device to which "IP address 2000" is assigned during a period in which the subject device executes the object software. An objective database 113-2 illustrated in FIG. 5B is an objective database relating to generated system calls. As illustrated in FIG. 5B, the objective database 113-2 is a table in which items of "system call type", "occurrence frequency", and "risk index during occurrence of event" are associated with each other. For example, the objective database 113-2 indicates that the "risk index during occurrence of event" is "20" when "system call A" is generated "1 to 2" (number of times per hour) during a period in which the subject device executes the object software.

The circumstance database 114 illustrated in FIG. 1 is information indicating a criterion for determining the degree of risk depending on the attribution of the subject device and the attribution of the object software when the subject device executes the object software. FIG. 6 is a diagram illustrating a configuration example of the circumstance database 114. As illustrated in FIG. 6, the circumstance database 114 is a table in which information (data) indicating "development source country", information (data) indicating "development source linguistic area", information (data) indicating "installation country", and information (data) indicating "risk index by unauthorized operation" are associated with each other. The "development source country" represents an identifier capable of identifying a country where the object software has been developed. The "development source linguistic area" represents an identifier capable of identifying a linguistic area where the object software has been developed. The "installation country" represents an identifier capable of identifying a country in which the subject device has been installed.

The "risk index by unauthorized operation" represents a numerical value indicating a likelihood that the object software performs an unauthorized operation, such as a cyberattack, when the subject device executes the object software. For example, the circumstance database 114 illustrated in FIG. 6 indicates that the "risk index by unauthorized operation" is 30 when the object software developed in the linguistic area of "language z1" in "country Z" is executed by the subject device installed in "country V". Similarly, the circumstance database 114 illustrated in FIG. 6 indicates that the "unauthorized operation risk index" is 80 when the object software developed in the linguistic area of "language w1" in "country W" is executed, regardless of the country in which the subject device has been installed. In general, it is highly likely that the object software developed in a country with a high antisocial risk will perform an unauthorized operation such as a cyberattack. Further, in two countries having a hostile relationship, the object software is highly likely to perform an unauthorized operation when the object software developed in one of the countries is executed by the subject device installed in the other one of the countries. The circumstance database 114 is information indicating a criterion for determining the degree of risk when the subject device executes the object software on the basis of information about an international situation or the like.

The trail information 115 illustrated in FIG. 1 is information including a snapshot of the virtual machine 31 that is stored in the alleged malware 310. The snapshot is information (data) that indicates the virtual machine 31 and is stored in a memory included in the live sandbox server device 30.

The risk information collection unit 12 illustrated in FIG. 1 collects, from an external device, information relating to each database stored in the risk information storage unit 11 via the communication network 40, and then registers the collected information in each database stored in the risk information storage unit 11. For example, the risk information collection unit 12 collects the information from a management server device in a company that manages information indicating the association between "IP address of subject device" and "parent organization", and then registers the information in the subject attribution database 110. The risk information collection unit 12 collects information relating to a security policy from a management server device in a company that manages the security policy for each organization, and then registers the information in the subjective database 112. With regard to the "risk index by policy violation" in the subjective database 112, the risk information collection unit 12 may set a value based on a predetermined calculation criterion, or a system administrator who manages the anti-malware system 1 may set a value.

In addition, the risk information collection unit 12 may collect, via the Internet, information provided by news or social media and information such as travel safety information by using a predetermined keyword as a key, and then register the collected information in the circumstance database 114. In this case, the risk information collection unit 12 may set the value of "risk index by unauthorized operation" based on a predetermined calculation criterion, or the system administrator may set the value. When the system administrator registers each database stored in the risk information storage unit 11, note that the anti-malware device 10 does not necessarily need to include the risk information collection unit 12.

When the terminal device 20 acquires the software 200, the subject attribution collection unit 13 collects, from the terminal device 20, an IP address as information indicating the attribution of the terminal device 20, and inputs the collected IP address to the determination unit 15. When a management server device that manages the attribution of the terminal device 20 is present in the anti-malware system 1, the subject attribution collection unit 13 may collect information such as the IP address indicating the attribution of the terminal device 20 from the management server device.

When the terminal device 20 acquires the software 200, the object attribution collection unit 14 collects information indicating the attribution of the software from a binary code or a source code of the software 200 stored in the terminal device 20. The object attribution collection unit 14 calculates a hash value by inputting the binary code of the software 200 to a predetermined hash function, for example. Alternatively, the object attribution collection unit 14 may acquire the IP address of the distribution source device that has distributed the software 200 from log information or the like obtained when the terminal device 20 acquires the software 200. The object attribution collection unit 14 inputs information indicating the attribution of the software 200 to the determination unit 15.

The determination unit 15 compares the IP address indicating the attribution of the terminal device 20 input from the subject attribution collection unit 13 with the subject attribution database 110 stored in the risk information storage unit 11. For example, when the IP address input from the subject attribution collection unit 13 is "IP address 1000", the determination unit 15 recognizes the terminal device 20 as the device that is owned by "organization A" and installed in "country X".

The determination unit 15 compares the hash value that is input from the object attribution collection unit 14 and indicates the attribution of the software 200 with the object attribution database 111 stored in the risk information storage unit 11. For example, when the hash value input from the object attribution collection unit 14 is "0005", the determination unit 15 recognizes the software 200 as the software that is developed in the linguistic area of "language w1" in "country W".

For example, when the determination unit 15 recognizes the terminal device 20 as the device that is owned by "organization A" and installed in "country X", the determination unit 15 applies "security policy AX" to the terminal device 20 and recognizes that the "policy violation risk index" is "70", by referring to the subjective database 112. When it turns out that an event that does not comply with the "security policy AX" occurs when the terminal device 20 executes the software 200 as a result of analyzing the software 200, the determination unit 15 sets the risk index to "70" when the terminal device 20 executes the software 200.

The determination unit 15 compares the result of analyzing the software 200 with the objective database 113. When it turns out that the event registered in the objective database 113 occurs when the terminal device 20 executes the software 200, the determination unit 15 adds the value of "risk index during occurrence of event" relating to the event to the risk index when the terminal device 20 executes the software 200.

The determination unit 15 compares the values respectively indicating the attribution of the terminal device 20 and the attribution of the software 200 with the circumstance database 114. As illustrated in FIG. 6, when the software 200 is the software developed in the linguistic area of "language w1" in "country W", for example, the "risk index by unauthorized operation" is "80", regardless of the country in which the terminal device 20 is installed. In this case, the determination unit 15 adds "80" to the risk index when the terminal device 20 executes the software 200.

The determination unit 15 determines whether or not the risk index when the terminal 20 executes the software 200 satisfies a determination criterion 150, the risk index being calculated by comparing the value indicating the attribution of the terminal device 20 and the attribution of the software 200 with each database stored in the risk information storage unit 11. The determination criterion 150 is information indicating a criterion for the determination unit 15 to determine the software 200 to be malware, and is, for example, a threshold relating to the risk index when the subject device executes the object software. In the case where the risk index satisfies the determination criterion 150 when the terminal device 20 executes the software 200, the determination unit 15 determines the software 200 to be malware, and inputs the determination result to each of the transfer unit 16 and the internal state collection unit 17.

When the determination unit 15 determines that the software 200 is malware, the transfer unit 16 transfers the software 200 to the virtual machine 31 in the live sandbox server device 30, and stores the software 200 as the alleged malware 310 in the virtual machine 31.

After the virtual machine 31 stores the alleged malware 310, the internal state collection unit 17 collects the snapshot of the virtual machine 31 at the time before the alleged malware 310 is executed, and stores the collected snapshot as the trail information 115 in the risk information storage unit 11.

The internal state collection unit 17 extracts the alleged malware 310 as a sample from the trail information 115. The internal state collection unit 17 conducts a static analysis on the sample, and stores the analysis result as the objective database 113 in the risk information storage unit 11. After the virtual machine 31 starts execution of the alleged malware 31, the internal state collection unit 17 collects information indicating the operation of the alleged malware 310, and stores the collected information as the objective database 113 in the risk information storage unit 11. The information indicating the operation of the alleged malware 310 is at least one of the IP address of a communication destination device, the communication frequency, the argument of a system call, and the frequency of system calls, for example. The internal state collection unit 17 may set the value of "risk index during occurrence of event" in the objective database 113 on the basis of a predetermined calculation criterion, or the system administrator may set the value.

Figure 7:
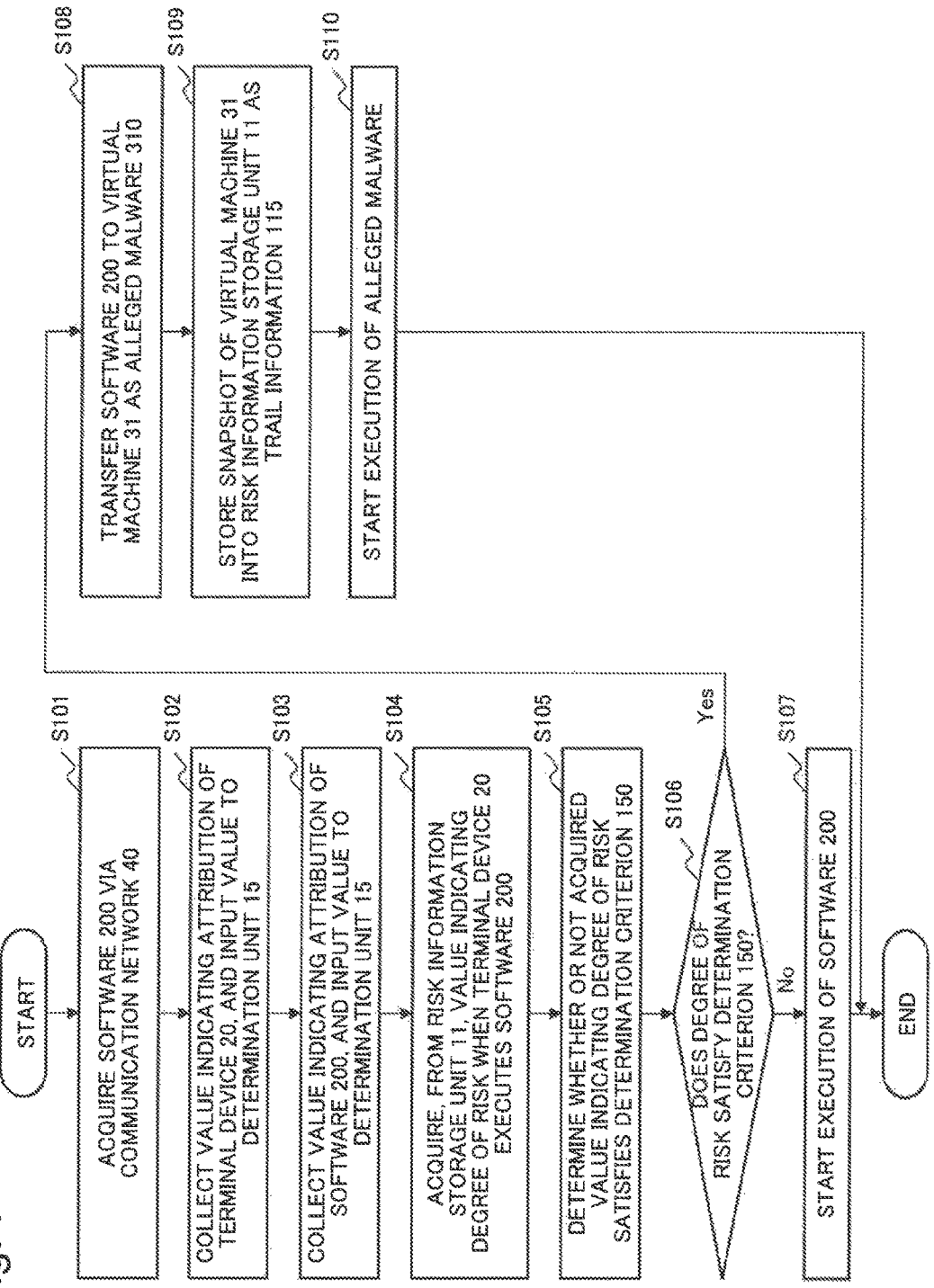
FIG. 7 is a flowchart illustrating an operation of an anti-malware system 1 according to the first example embodiment of the present invention.

Next, the operation (processing) of the anti-malware system 1 according to this example embodiment will be described in detail with reference to the flowchart of FIG. 7.

The terminal device 20 acquires the software 200 via the communication network 40 (step S101). The subject attribution collection unit 13 collects a value indicating the attribution of the terminal device 20, and inputs the collected value to the determination unit 15 (step S102). The object attribution collection unit 14 collects a value indicating the attribution of the software 200, and inputs the collected value to the determination unit 15 (step S103). The determination unit 15 acquires, from the risk information storage unit 11, the value indicating the degree of risk when the terminal device 20 executes the software 200 (step S104).

The determination unit 15 determines whether or not the acquired value indicating the degree of risk satisfies the determination criterion 150 (step S105). When the value indicating the degree of risk does not satisfy the determination criterion 150 (No in step S106), the terminal device 20 starts execution of the software 200 (step S107), and the entire process is terminated.

When the value indicating the degree of risk satisfies the determination criterion 150 (Yes in step S106), the transfer unit 16 transfers the software 200 as the alleged malware 310 to the virtual machine 31 (step S108). The internal state collection unit 17 stores the snapshot of the virtual machine 31 as the trail information 115 in the risk information storage unit 11 (step S109). The virtual machine 31 starts execution of the alleged malware 310 (step S110), and the entire process is terminated.

The anti-malware system 1 according to this example embodiment can detect malware with high accuracy. This is because the determination unit 15 determines whether or not the software 200 is malware on the basis of the value indicating the degree of risk obtained by comparing the value indicating the attribution of the terminal device 20 that is collected by the subject attribution collection unit 13 and the value indicating the attribution of the software 200 that is collected by the object attribution collection unit 14 with each database stored in the risk information storage unit 11.

Advantageous effects of the anti-malware system 1 according to this example embodiment will be described in detail below. In the general malware detection method, malware is detected based only on an event objectively observed with regard to the operation of the object software.

However, the event determined to be malware is not always generated with a malicious intention, but may be generated by the provider that has distributed the object software or the user that executes the object software, for an unmalicious valid purpose. More precisely, whether or not the object software is malware is determined not only by an event objectively observed with regard to the operation of the object software, but also by various factors depending on the attribution of the subject device and the attribution of the object software. Accordingly, it is difficult for the general malware detection method to detect malware with high accuracy.

On the other hand, in the anti-malware device 10 according to this example embodiment, the risk information storage unit 11 stores a database in which the value indicating the attribution of the subject device, the value indicating the attribution of the object software, and the value that depends on the attribution of the subject device and the attribution of the object software and that indicates the degree of risk when the object software is executed by the subject device are associated with each other. The subject attribution collection unit 13 collects the value indicating the attribution of the subject device, and the object attribution collection unit 14 collects the value indicating the attribution of the object software. Further, the determination unit 15 determine whether or not the object software is malware, based on the value indicating the degree of risk obtained by comparing the collected values indicating the attribution of the subject device and the attribution of the object software with the database stored in the risk information storage unit 11. Accordingly, the anti-malware device 10 according to this example embodiment can detect malware with high accuracy by making a determination using information based on the comprehensive aspect (viewpoint) as described above.

Further, when the object software, which is malware, is executed by the subject device, there is a possibility that a problem occurs such as classified information may be leaked from the subject device by an unauthorized operation of the object software, until it is detected that the object software is malware. On the other hand, in the anti-malware device 10 according to this example embodiment, when the determination unit 15 determines that the software 200 is malware, the transfer unit 16 transfers the software 200 to the virtual machine 31 in the live sandbox server device 31 from the terminal device 20, and stores the software as the alleged malware 310. According to the instruction from the transfer unit 16, the terminal device 20 does not execute the software 200 and the virtual machine 31 executes the alleged malware 310. In other words, the anti-malware device 10 isolates the software 200 that is suspected to be malware in the live sandbox server device 31 in advance as the alleged malware 310. Thus, the anti-malware device 10 according to this example embodiment can prevent the above-mentioned problem from occurring.

In many cases, malware is deleted after the malware has achieved the object by performing an unauthorized operation. In this case, the malware cannot be analyzed by reproducing the operation of the malware. On the other hand, in the anti-malware device 10 according to this example embodiment, the internal state collection unit 17 collects the snapshot of the virtual machine 31 and stores the snapshot into the risk information storage unit 11 as the trail information 115 before the virtual machine 31 executes the alleged malware 310. Accordingly, the anti-malware device 10 can analyze malware by extracting a sample of malware from the trail information 115, even after the malware itself is deleted.

Further, since the anti-malware device 10 according to this example embodiment includes the risk information collection unit 12, each database stored in the risk information storage unit 11 can be efficiently constructed.

Note that the subject attribution collection unit 13, the object attribution collection unit 14, and the determination unit 15 may be built in the terminal device 20. In this case, the determination unit 15 accesses the risk information storage unit 11 via the communication network 40. Further, the transfer unit 16 and the internal state collection unit 17 may be built in the terminal device 20 and the live sandbox server device 30, respectively.

The anti-malware system 1 may include a server device that operates in a real machine environment, instead of the live sandbox server device 30. In this case, the internal state collection unit 17 collects log information of the server device that operates in the real machine environment and information stored in a memory, a disk, or the like included in the server device, instead of collecting the snapshot of the virtual machine 31.

<Second Example Embodiment>

Figure 8:
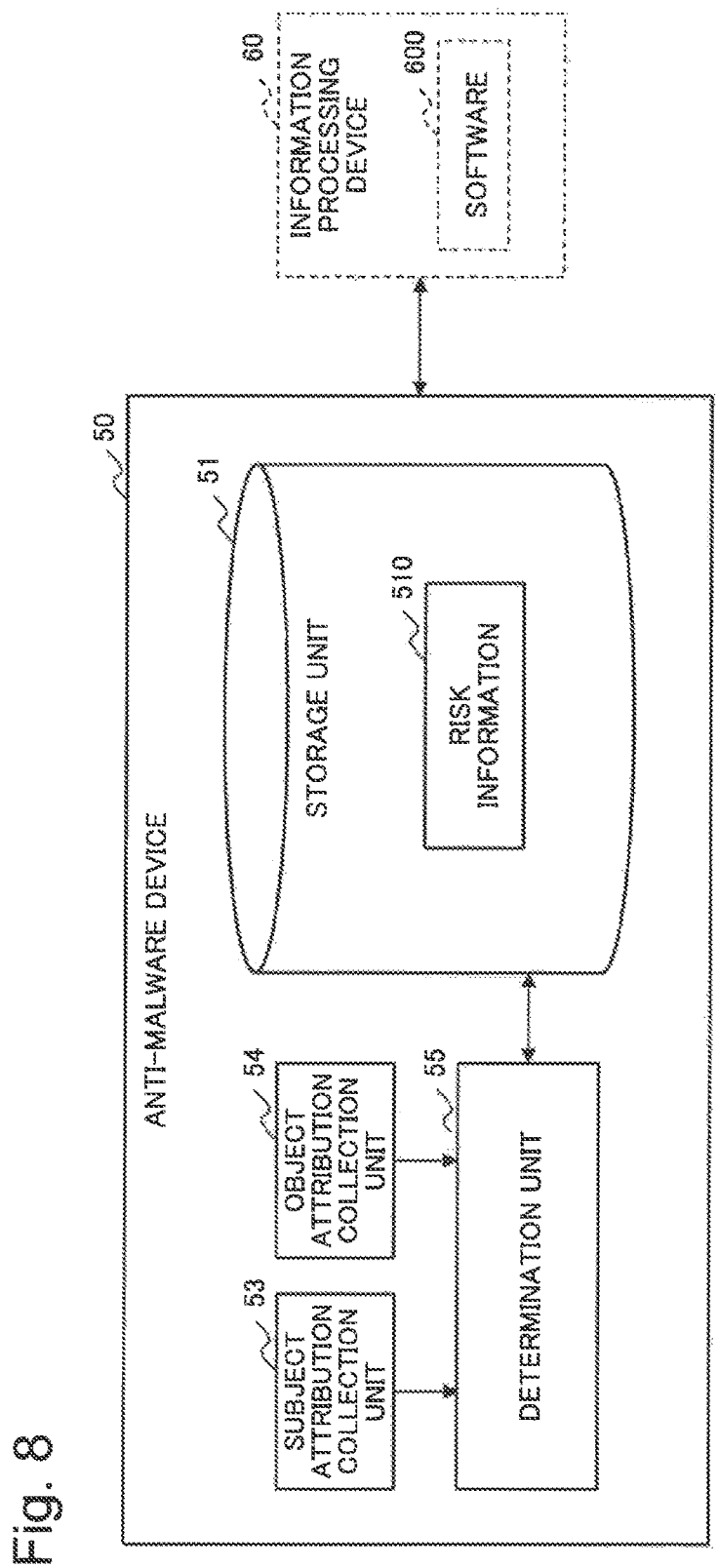
FIG. 8 is a block diagram illustrating a configuration of an anti-malware device 50 according to a second example embodiment of the present invention.

FIG. 8 is a block diagram conceptually illustrating a configuration of an anti-malware device 50 according to a second example embodiment.

The anti-malware device 50 according to this example embodiment includes a storage unit 51, a subject attribution collection unit 53, an object attribution collection unit 54, and a determination unit 55.

The storage unit 51 stores risk information 510. The risk information 510 is information in which there are associated the value indicating the attribution of an information processing device 60 that executes software 600, the value indicating the attribution of the software 600, and the value that depends on the attribution of the information processing device 60 and the attribution of the software 600 and that indicates the degree of risk when the software 600 is executed by the information processing device 60.

The subject attribution collection unit 53 collects the value indicating the attribution of the information processing device 60 from the outside.

The object attribution collection unit 54 collects the value indicating the attribution of the software 600 from the outside.

The determination unit 55 determines that the software 600 is malware when the value indicating the degree of risk satisfies the criterion, the value being obtained by comparing the risk information 510 with the values collected by the subject attribution collection unit 53 and the object attribution collection unit 54.

The anti-malware device 50 according to this example embodiment can detect malware with high accuracy. This is because the determination unit 55 determines whether or not the software 600 is malware on the basis of the value indicating the degree of risk obtained by comparing the value indicating the attribution of the information processing device 60 that is collected by the subject attribution collection unit 53 and the value indicating the attribution of the software 600 that is collected by the object attribution collection unit 54 with the risk information 510 stored in the storage unit 51.

<Hardware Configuration Example>

In the example embodiments described above, the parts illustrated in FIGS. 1 and 8 can be implemented by a dedicated HW (HardWare) (electronic circuit). Further, at least the subject attribution collection units 13 and 53, the object attribution collection units 14 and 54, the determination units 15 and 55, the transfer unit 16, and the internal state collection unit 17 can be set as a function (processing) unit (software module) of a software program. However, the parts illustrated in the drawings are sectioned for the convenience of explanation, and various configurations can be assumed for implementation. An example of a hardware environment in this case will be described with reference to FIG. 9.

Figure 9:
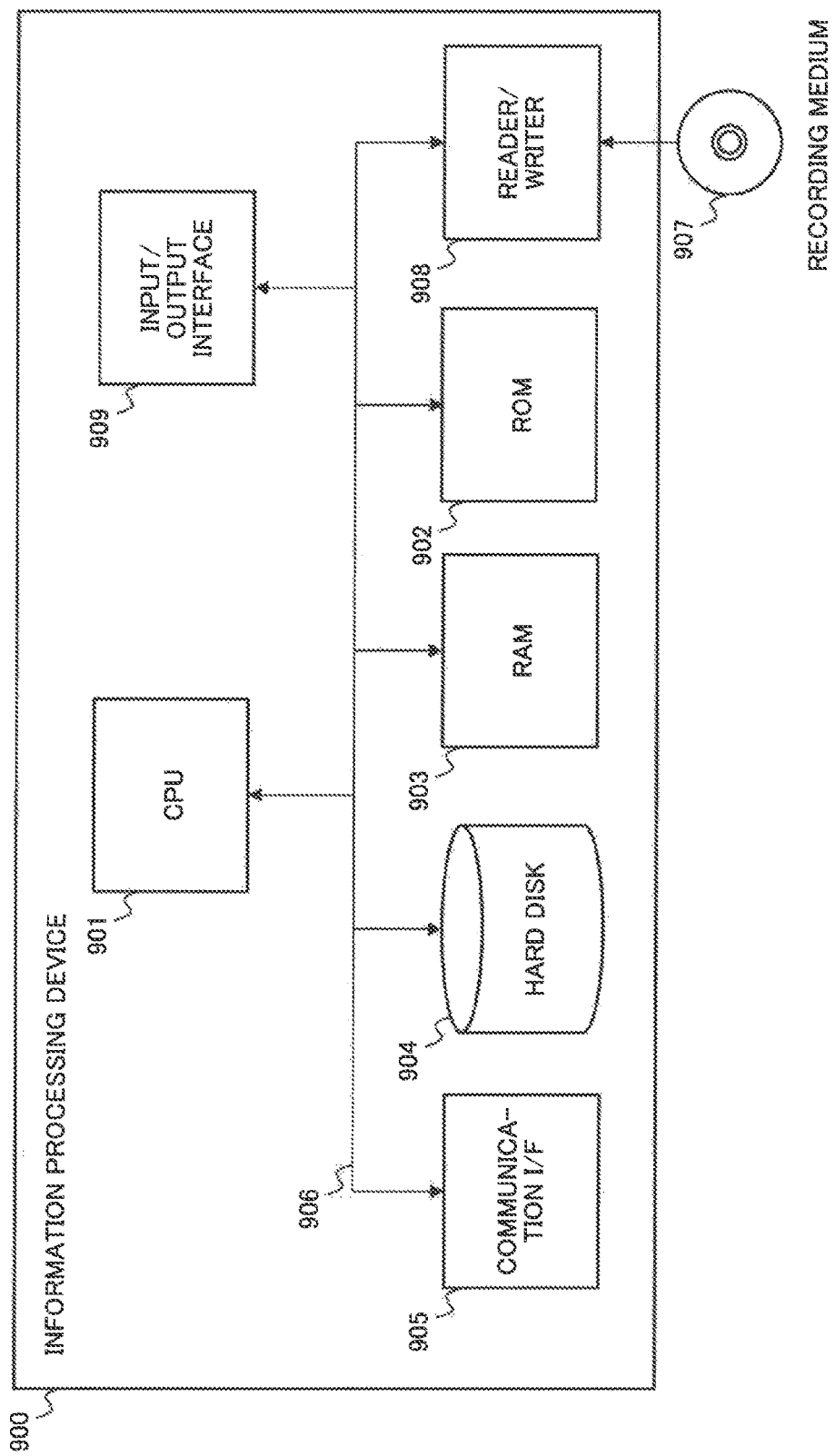
FIG. 9 is a block diagram exemplifying a configuration of an information processing device 900 capable of executing an anti-malware device according to each example embodiment of the present invention.

FIG. 9 is a diagram exemplifying a configuration of an information processing device 900 (computer) capable of executing the anti-malware devices according to example embodiments of the present invention. In other words, FIG. 9 illustrates a configuration of a computer (information processing device) capable of executing the anti-malware devices illustrated in FIGS. 1 and 8, and illustrates a hardware environment capable of implementing each function in the above example embodiments.

The information processing device 900 illustrated in FIG. 9 includes the following components.

CPU (Central_Processing_Unit) 901,
ROM (Read_Only_Memory) 902,
RAM (Random_Access_Memory) 903,
Hard disk (storage device) 904,
Communication interface 905 with an external device,
Bus 906 (communication line),
Reader/writer 908 capable of reading and writing data stored in a recording medium 907 such as a CD-ROM (Compact_Disc_Read_Only_Memory), and
Input/output interface 909.

The information processing device 900 is a general computer in which the above-mentioned components are connected via the bus 906.

The present invention described above with reference to example embodiments supplies a computer program capable of implementing the following functions to the information processing device 900 illustrated in FIG. 9. The functions are the subject attribution collection units 13 and 53, the object attribution collection units 14 and 54, the determination units 15 and 55, the transfer unit 16, and the internal state collection unit 17, which are illustrated in the functional block diagrams (FIGS. 1 and 8) referred to in the description of the example embodiments, or the functions of the flowchart (FIG. 7). After that, the present invention is achieved by loading the computer program into the CPU 901 of the hardware for interpreting and executing the computer program. Further, the computer program supplied within the device may be stored in a readable/writable volatile memory (RAM 903) or a non-volatile storage device such as the hard disk 904.

In the above-mentioned case, a general procedure can be currently employed as a method for supplying the computer program into the hardware. Examples of the procedure include a method of installing the computer program in the device via various recording media 907 such as a CD-ROM, and a method of downloading the computer program from the outside via a communication line such as the Internet. In such a case, it can be understood that the present invention is configured by a code that constitutes the computer program, or by the recording medium 907 storing the code.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2015-014873, filed on Jan. 29, 2015, the disclosure of which is incorporated herein in its entirety by reference.

REFERENCE SIGNS LIST

1 Anti-malware system
10 Anti-malware device
11 Risk information storage unit
110 Subject attribution database
111 Object attribution database
112 Subjective database
113 Objective database
114 Circumstance database
115 Trail information
12 Risk information collection unit
13 Subject attribution collection unit
14 Object attribution collection unit
15 Determination unit
150 Determination criterion
16 Transfer unit
17 Internal state collection unit
20 Terminal device
21 Console display unit
200 Software
30 Live sandbox server device
31 Virtual machine
310 Alleged malware
40 Communication network
50 Anti-malware device
51 Storage unit
510 Risk information
53 Subject attribution collection unit
54 Object attribution collection unit
55 Determination unit
900 Information processing device
901 CPU
902 ROM
903 RAM
904 Hard disk (storage device)
905 Communication interface
906 Bus
907 Recording medium
908 Reader/writer
909 Input/output interface

The invention claimed is:

1. An anti-malware device comprising:
a storage to store risk information in which there are associated a value indicating an attribution of a first information processing device configured to execute software, a value indicating an attribution of the software, and a value that depends on the attributions of the first information processing device and the software and that indicates a degree of risk when the software is executed by the first information processing device;
a memory that stores a set of instructions; and
at least one processor configured to execute the set of instructions to:
collect the value indicating the attribution of the first information processing device from outside;
collect the value indicating the attribution of the software from outside; and
determine that the software is malware when the value indicating the degree of risk satisfies a criterion, the value being obtained by comparing the risk information with the values collected; and transfer the software to a second information processing device when it is determined that the software is malware, and then cause the second information processing device to execute the software.

2. The anti-malware device according to claim 1, wherein the at least one processor is configured further to:
collect information indicating an internal state from the second information processing device after the software transfers to the second information processing device and before the second information processing device is caused to execute the software.

3. The anti-malware device according to claim 2, wherein the at least one processor is configured further to:
transfer the software to the second information processing device being a virtual machine, and
collect a snapshot of the second information processing device before the second information processing device is caused to execute the software.

4. The anti-malware device according to claim 2, wherein the at least one processor is configured further to:
collect information indicating an operation of the software being executed by the second information processing device and store the collected information into the storage as the risk information.

5. The anti-malware device according to claim 4, wherein the at least one processor is configured further to:
collect at least one of an IP address of a communication destination device, a communication frequency, an argument of a system call, and a frequency of the system call, as the information indicating the operation of the software being executed by the second information processing device.

6. The anti-malware device according to claim 1, wherein the at least one processor is configured further to:
collect the risk information from an accessible external device via a communication network connected in a communicable manner, and store the collected risk information into the storage.

7. The anti-malware device according to claim 1, wherein the at least one processor is configured further to:
collect an IP address assigned to the first information processing device from the first information processing device.

8. The anti-malware device according to claim 7, wherein the storage stores the risk information in which the IP address assigned to the first information processing device is associated with an identifier capable of identifying an organization which owns the first information processing device or in which the first information processing device is installed.

9. The anti-malware device according to claim 8, wherein the storage stores the risk information in which there are associated the identifier capable of identifying the organization which owns the first information processing device or by which the first information processing device is installed, information relating to the development source which developed the software, and the value indicating the degree of risk.

10. The anti-malware device according to claim 1, wherein the at least one processor is configured further to:
collect a hash value obtained by inputting a binary code of the software to a hash function.

11. The anti-malware device according to claim 10, wherein
the storage stores the risk information in which the hash value is associated with information relating to a development source which developed the software.

12. The anti-malware device according to claim 1, wherein
the storage stores the risk information in which a content of a security policy applied to the first information processing device is associated with a value indicating the degree of risk when an operation that is non-conforming to the security policy is performed at a time when the first information processing device executes the software.

13. The anti-malware device according to claim 1, wherein
the storage stores the risk information in which the value indicating the degree of risk is associated with information indicating a content of an event occurring when the first information processing device executes the software.

14. An anti-malware system comprising:
an anti-malware device including:
a storage to store risk information in which there are associated a value indicating an attribution of a first information processing device configured to execute software, a value indicating an attribution of the software, and a value that depends on the attributions of the first information processing device and the software and that indicates a degree of risk when the software is executed by the first information processing device;
a memory that stores a set of instruction;
and at least one processor configured to execute the set of instructions to:
collect the value indicating the attribution of the first information processing device from outside;
collect the value indicating the attribution of the software from outside; and
determine that the software is malware when the value indicating the degree of risk satisfies a criterion, the value being obtained by comparing the risk information with the values collected; and
transfer the software to a second information processing device when it is determined that the software is malware, and then cause the second information processing device to execute the software; and
the first information processing device and the second information processing device.

15. An anti-malware method comprising, when storage stores risk information in which there are associated a value indicating an attribution of a first information processing device configured to execute software, a value indicating an attribution of the software, and a value that depends on the attributions of the first information processing device and the software and that indicates a degree of risk when the software is executed by the first information processing device:
by a third information processing device comprising a memory that stores a set of instructions and at least one processor configured to execute the set of instructions,
collecting the value indicating the attribution of the first information processing device from outside;
collecting the value indicating the attribution of the software from outside;
determining that the software is malware when the value indicating the degree of risk satisfies a criterion, the value being obtained by comparing the risk information with the values collected, indicating the attribution of the first information processing device and the attribution of the software; and
transferring the software to a second information processing device when it is determined that the software is malware, and then causing the second information processing device to execute the software.

16. The anti-malware method according to claim 15, wherein
information indicating an internal state is collected from the second information processing device after the software is transferred to the second information processing device and before the second information processing device is caused to execute the software.

17. A non-transitory computer readable recording medium storing an anti-malware program for causing a computer accessible to storage for storing risk information in which there are associated a value indicating an attribution of a first information processing device configured to execute software, a value indicating an attribution of the software, and a value that depends on the attributions of the first information processing device and the software and that indicates a degree of risk when the software is executed by the first information processing device, to execute:
 a process of collecting the value indicating the attribution of the first information processing device from outside;
 a process of collecting the value indicating the attribution of the software from outside;
 a process of determining that the software is malware when the value indicating the degree of risk satisfies a criterion, the value being obtained by comparing the risk information with the values collected in the subject attribution collection process and the object attribution collection process; and
 a process of transferring the software to a second information processing device when it is determined that the software is malware and then causing the second information processing device to execute the software.

18. The non-transitory computer readable recording medium storing the anti-malware program according to claim 17, further causing the computer to execute
 an internal state collection process of collecting information indicating an internal state from the second information processing device after the software is transferred to the second information processing device and before the second information processing device is caused to execute the software.

* * * * *

UNITED STATES PATENT AND TRADEMARK OFFICE
CERTIFICATE OF CORRECTION

PATENT NO. : 10,482,240 B2  
APPLICATION NO. : 15/543599  
DATED : November 19, 2019  
INVENTOR(S) : Masaru Kawakita Page 1 of 1

It is certified that error appears in the above-identified patent and that said Letters Patent is hereby corrected as shown below:

In the Claims

Column 16, Line 27; In Claim 14, delete "instruction;" and insert --instructions;-- therefor Signed and Sealed this  
Twenty-fourth Day of November, 2020

Andrei Iancu  
*Director of the United States Patent and Trademark Office*